United States Patent [15] 3,707,707

Spencer et al. [45] Dec. 26, 1972

[54] DIGITAL CASSETTE MAGNETIC TAPE RECORDER AND REPRODUCER

[72] Inventors: Dale A. Spencer; William M. Barton, Jr., both of San Diego, Calif.

[73] Assignee: Cipher Data Products, Inc., San Diego, Calif.

[22] Filed: Nov. 12, 1970

[21] Appl. No.: 88,884

[52] U.S. Cl.......340/174.1 B, 179/100.2 Z, 226/111, 226/195

[51] Int. Cl.......G11b 5/44, B65h 17/42, B65h 23/08

[58] Field of Search...179/100.2 Z, 100.2 S, 100.2 K, 179/100.2 B; 340/174.1 C, 174.1 B, 174.1 G; 226/108, 111, 195; 242/.55

[56] References Cited

UNITED STATES PATENTS

| | | | |
|---|---|---|---|
| 3,578,334 | 5/1971 | Ban | 179/100.2 Z |
| 3,594,008 | 7/1971 | Takagi | 179/100.2 Z |
| 3,586,336 | 6/1971 | Rosenblatt | 179/100.2 Z |
| 3,112,052 | 11/1963 | Johnson | 226/111 |
| 3,583,618 | 6/1971 | Lewis | 226/195 |
| 3,419,202 | 12/1968 | Maxey | 226/195 |
| 3,479,662 | 11/1969 | Bradford et al. | 340/174.1 F |

*Primary Examiner*—Vincent P. Canney
*Attorney*—Flehr, Hohbach, Test, Albritton & Herbert

[57] ABSTRACT

Digital cassette magnetic tape recorder and reproducer having dual capstans with phase-locked loop means for synchronizing operation of the capstans for maintaining a substantially fixed tension on the tape loop of the cassette during starting, stopping and running conditions.

24 Claims, 9 Drawing Figures

PATENTED DEC 26 1972

3,707,707

SHEET 1 OF 4

INVENTORS

DALE A. SPENCER
WILLIAM M. BARTON, JR.

Flehr, Hohbach, Test, Albritton & Herbert
ATTORNEYS

INVENTORS
DALE A. SPENCER
WILLIAM M. BARTON, JR.
BY Flehr, Hohbach, Test, Albritton & Herbert
ATTORNEYS INVENTORS
DALE A. SPENCER
WILLIAM M. BARTON, JR.
BY Flehr, Hohbach, Test, Albritton & Herbert
ATTORNEYS INVENTORS
DALE A. SPENCER
WILLIAM M. BARTON, JR
BY
Flehr, Hohbach, Test, Albritton & Herbert
ATTORNEYS

DIGITAL CASSETTE MAGNETIC TAPE RECORDER AND REPRODUCER

BACKGROUND OF THE INVENTION

1. Field of the Invention

This invention relates to cassette recorder-reproducers and more particularly to digital cassette recorder-reproducers capable of operating in read and write, and read while writing modes.

2. Description of the Prior Art

Cassette recorder-reproducers heretofore have been available for the recording of audio frequencies. However, in such recorder-reproducers there has only been the requirement that they play in one direction and rapid starting and stopping of the tape is not required. If such cassette recorder-reproducers are to be used for digital applications, it is necessary to start and stop the tape very rapidly. It is also desirable that the recorder-reproducer have bi-directional capabilities. Attempts have been made to provide digital cassette recorder-reproducers. However, they have been found to have a number of disadvantages. For example, certain of such recorder-reproducers are not capable of operating bi-directionally. In addition, in such recorder-reproducers, it has been difficult to back space very small amounts to correct errors and the like. Also, it has been found that such cassette recorder-reproducers do not provide the operating flexibility that computer software programmers have become accustomed to. There is, therefore, a need for a new and improved digital cassette recorder-reproducer.

SUMMARY OF THE INVENTION AND OBJECTS

The digital recorder-reproducer for use with a cassette of the type having a tape disposed therein consists of a framework with the framework including a top plate. First and second reel drive shafts are rotatably mounted with respect to the framework and extend through and above the top plate with said shafts being adapted to engage the reels on the cassette. First and second capstans are carried by the framework and extend through the top plate and are adapted to engage the tape in the cassette. First and second motive means are connected to the first and second capstans, respectively. Means is provided for synchronizing the operation of the motive means driving said first and second capstans whereby said capstans maintain a substantially fixed tension on the tape loop between the capstans during starting, stopping and running conditions for the tape.

In general, it is an object of the present invention to provide a digital cassette recorder-reproducer which is capable of operating bi-directionally in read and write modes.

Another object of the invention is to provide a cassette recorder-reproducer of the above character which is capable of continuous operation or incremental operation.

Another object of the invention is to provide a recorder-reproducer of the above character which has read after write capability.

Another object of the invention is to provide a recorder-reproducer of the above character which utilizes dual capstans to eliminate spurious tape motion at the head.

Another object of the invention is to provide a recorder-reproducer of the above character in which the tape head is moved into and out of engagement with the tape by opening and closing a door on the cabinet for the recorder.

Another object of the invention is to provide a recorder-reproducer of the above character in which the cassette can be readily inserted and removed.

Additional objects and features of the invention will appear from the following description in which the preferred embodiment is set forth in detail in conjunction with the accompanying drawing.

DESCRIPTION OF THE PREFERRED EMBODIMENT

The digital cassette recorder-reproducer, hereinafter referred to as a recorder, consists of a tape transport mechanism 10 and the associated electronics. The mechanism 10 includes a U-shaped framework 12 secured to the top plate assembly 11 and has mounted therein the electronics for the recorder as hereinafter described. A U-shaped case 13 is mounted over the U-shaped framework 12 and also is secured to the top plate assembly 11.

Figures 2, 3:
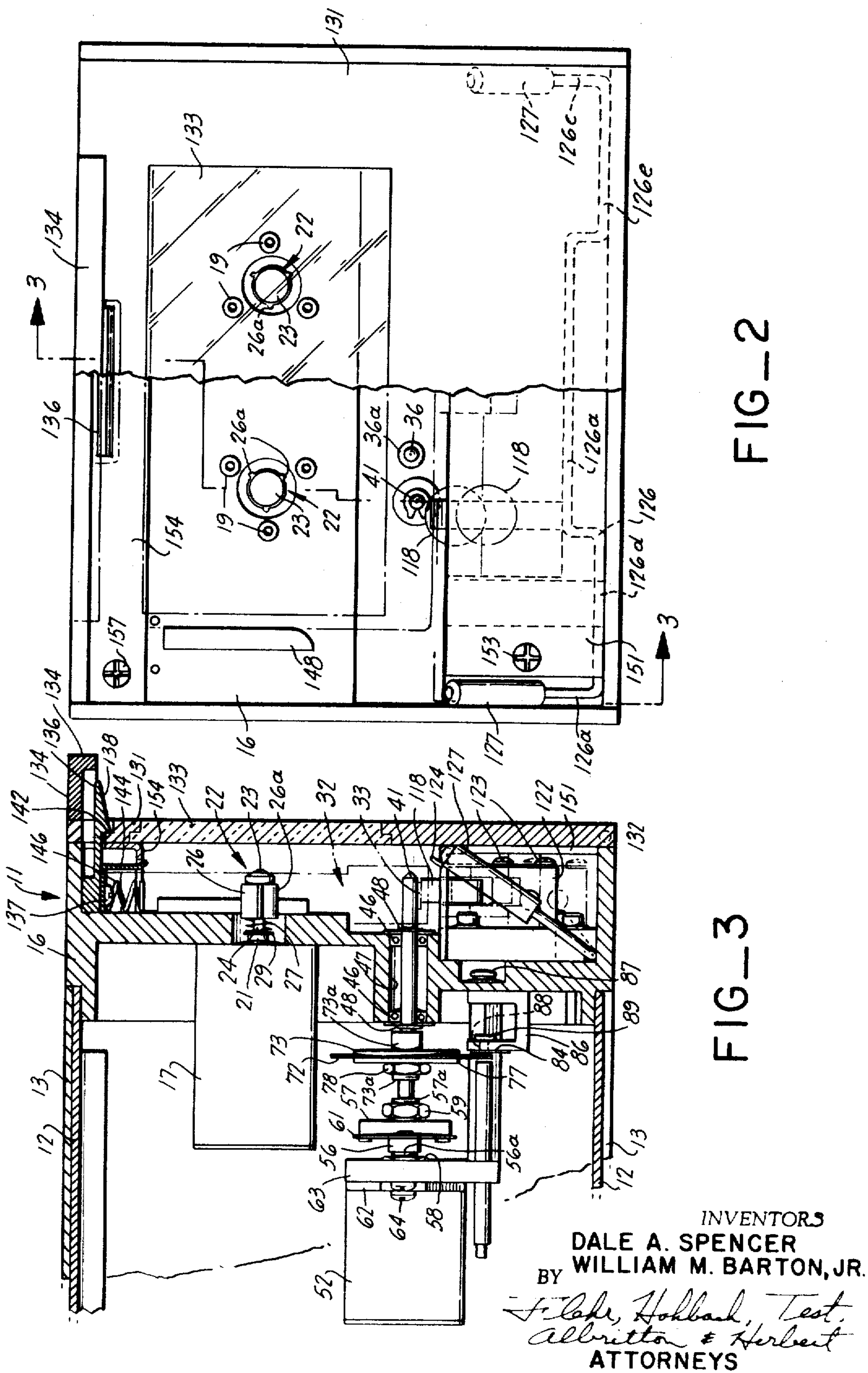
FIG. 2 is an enlarged front elevational view of the recorder-reproducer shown in FIG. 1.
FIG. 3 is a cross-sectional view taken along the line 3—3 of FIG. 2.
Figure 6:
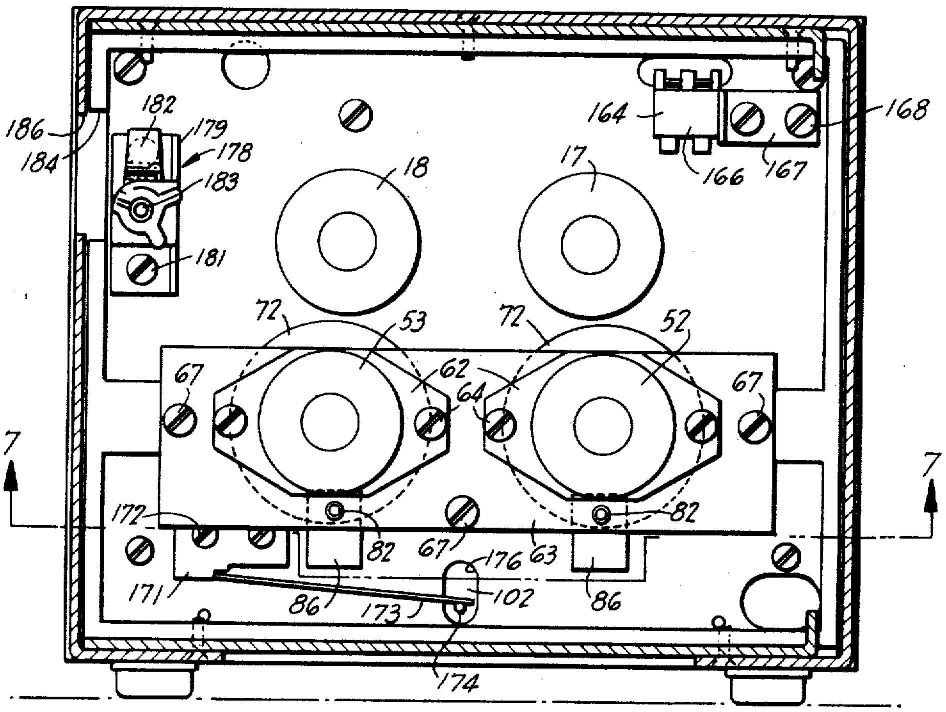
FIG. 6 is a rear elevational view of a portion of the cassette recorder-reproducer shown in FIG. 1.
Figure 7:
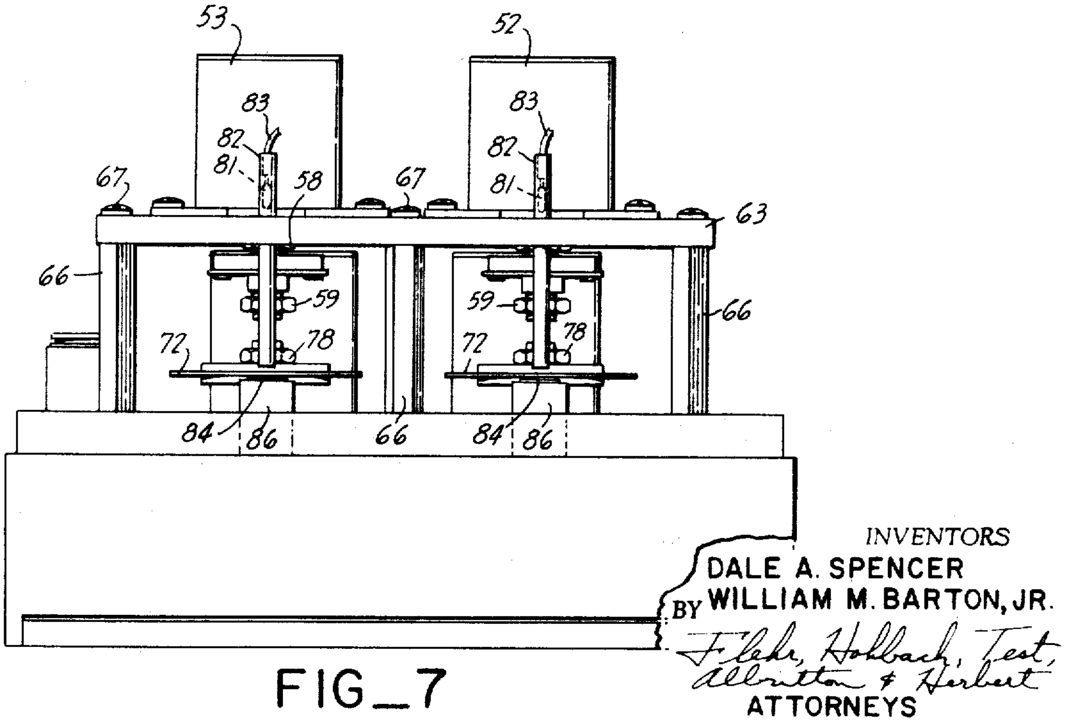
FIG. 7 is a view taken along the line 7—7 of FIG. 6.

The top plate assembly 11 (see FIG. 3) consists of a top plate or base 16 in the form of a casting formed of a suitable material such as aluminum. A first reel drive motor 17 (see FIGS. 3 and 6) and a second reel drive motor 18 are mounted on the top plate 16 in a suitable manner. For example, as shown, the motors can be tapped and secured to the top plate 16 by "Allen head" screws 19. The motors 17 and 18 are of a conventional type such as permanent magnet d.c. motors. Each of the motors 17 and 18 has an output shaft 21 that extends through the top plate 16 and which has mounted thereon a hub drive assembly 22. The hub drive assembly consists of a cap 23 having an integral stem 24 formed of a suitable material such as Delrin. The cap and stem are mounted on the output shaft 21 by suitable means such as a press fit. A spring-loaded dog 26 is provided as a part of the hub drive assembly 22. It is in the form of a cylindrical sleeve having three outwardly extending ear-like portions *26a*. The dog also has one end of the same substantially closed and which is engaged by one end of a spring 27 disposed within the dog and mounted coaxially on the stem 24. The other end of the spring is engaged by a retaining ring 29 mounted on the lower extremity of the stem 24.

The two hub drive assemblies 22 which are driven by the first and second reel drive motors 17 and 18 are adapted to engage reels 31 having teeth 31a of a conventional cassette 32. The cassette 32 has a length of tape 33 disposed within the cassette and carried by the reels 31 within the cassette. In driving the reels 31 of the cassette, the motor 17 can be considered as driving the supply reel, whereas the motor 18 can be considered as driving the take-up reel. A window 34 is provided in the cassette for viewing of the reels 31 and the tape 33 wound thereon.

A pair of registration pins 36 (see FIG. 2) are mounted in the top plate 16 and extend outwardly therefrom. The pins are adapted to mate with a pair of holes 37 provided in the cassette 32 and serve to hold the cassette in a precise registration in an X–Y plane with a tape head assembly 38 which is adapted to engage the tape in the cassette as it is transferred between the reels 31. The tape 33 on opposite sides of the head assembly 38 is adapted to be engaged by first and second capstans 41 and 42, which are adapted to extend through holes 43 provided in the cassette 32. As can be seen, the capstans 41 and 42 are disposed on one side of the tape, whereas the head assembly 38 is disposed on the opposite side of the tape. Each of the capstans 41 and 42 is rotatably mounted in the top plate 16 by flanged spaced bearing assemblies disposed on the ends of a hole 47 provided in the top plate 16. The bearing assemblies and the capstans associated therewith are held in place by retaining rings 48 and glue. The capstans 41 and 42 are connected by flexible couplings 49 to output shafts 51 of a first motor 52 and a second motor 53. The first and second motors 52 and 53 are also of a conventional type such as a permanent magnet d.c. motor.

The flexible couplings 49 consist of first and second arms 56 and 57 formed of a suitable material such as Delrin. The arm 56 is provided with a hub-like portion 56a which is split and is slipped over the end of the output shaft 51. A nut 58 is threaded onto the hub-like portion and serves as a collet to clamp the hub to the output shaft. The arm 57 is provided with a similar split hub portion 57a which is clamped to the capstan by a nut 59. A flexible disc 61 is provided and is formed of a suitable material such as Mylar. The arms 56 and 57 are disposed at 90° with respect to each other and are secured to the disc 61 in a suitable manner such as by providing holes in the disc and having protrusions carried by the ends of the arm extend therethrough and heating them to melt them into the Mylar. The couplings 49 give good torsional transmission while still making it possible to take care of any shaft misalignment between the output shaft of the motor and the capstan.

The motors 52 and 53 are secured to brackets 62 by suitable means such as screws (not shown) extending through the brackets 62 and further into tapped holes (not shown) provided in the motors 52 and 53. The brackets 62 are secured to a mounting plate 63 by screws 64. The plate 63 is secured to three posts 66 by screws 67. The posts 66 are threaded into the rear side of the top plate 16.

Means is provided for synchronizing the operation of the first and second motors 52 and 53 which serve as the motive means for the capstans for maintaining a substantially fixed tension on the tape during the time that it is passing over the tape head during starting, stopping and running conditions for the tape. In part, such means consists of an optical encoder assembly 71 mounted on each of the capstans 41 and 42. The optical encoder assembly 71 consists of a disc 72 formed of a suitable transparent material such as Mylar. The disc 72 carries photographic emulsion so that there are formed on one side of the disc, equally spaced around the disc, 400 radially extending lines and 400 spaces. The disc 72 is secured to the capstan by suitable means such as a circular plate 73 which has a hub portion 73a. The hub portion 73a is secured to the capstan by glue. Another circular plate 77 is provided on the other side of the disc 72 and has a hub portion 73a of the plate 73 extending therethrough. A nut 78 is threaded onto the hub portion 73a and firmly clamps the disc 72 between the plates 73 and 77.

Means is provided for sensing the spaces and lines on each disc 72 and consists of a light source in the form of a miniature bulb 81 mounted in a small tube 82 formed of a suitable material such as brass. The bulb 81 is connected to wires 83 extending out of one end of the tube 82. The tube 82 is carried by the plate 63 and extends therethrough. The tube 82 serves as light collimating means for the light emanating from the miniature light bulb 81 and directs it through the open end of the tube onto one side of the disc 72. Light passing through the spaces of the disc 72 strikes a reticle 84 which is formed of a sector of a similar disc and which is also provided with lines and spaces similar to the lines and spaces on the disc 72. The reticle is positioned in such a manner so that the lines and spaces on the disc can be moved into registration with the lines and spaces on the reticle 84. The reticle 84 is mounted upon the U-shaped member 86 secured to the top plate 16 by suitable means such as screw 87 (see FIG. 3). The U-shaped member 86 is provided with a hole 88 through which light that passes through the reticle 84 can pass. A solar cell 89 is mounted on the U-shaped member on the other side of the hole 88 and is adapted to receive light which passes through the reticle 84. The solar cell 89 is secured to the U-shaped member 86 by suitable means such as cement.

Figures 1, 4, 5:
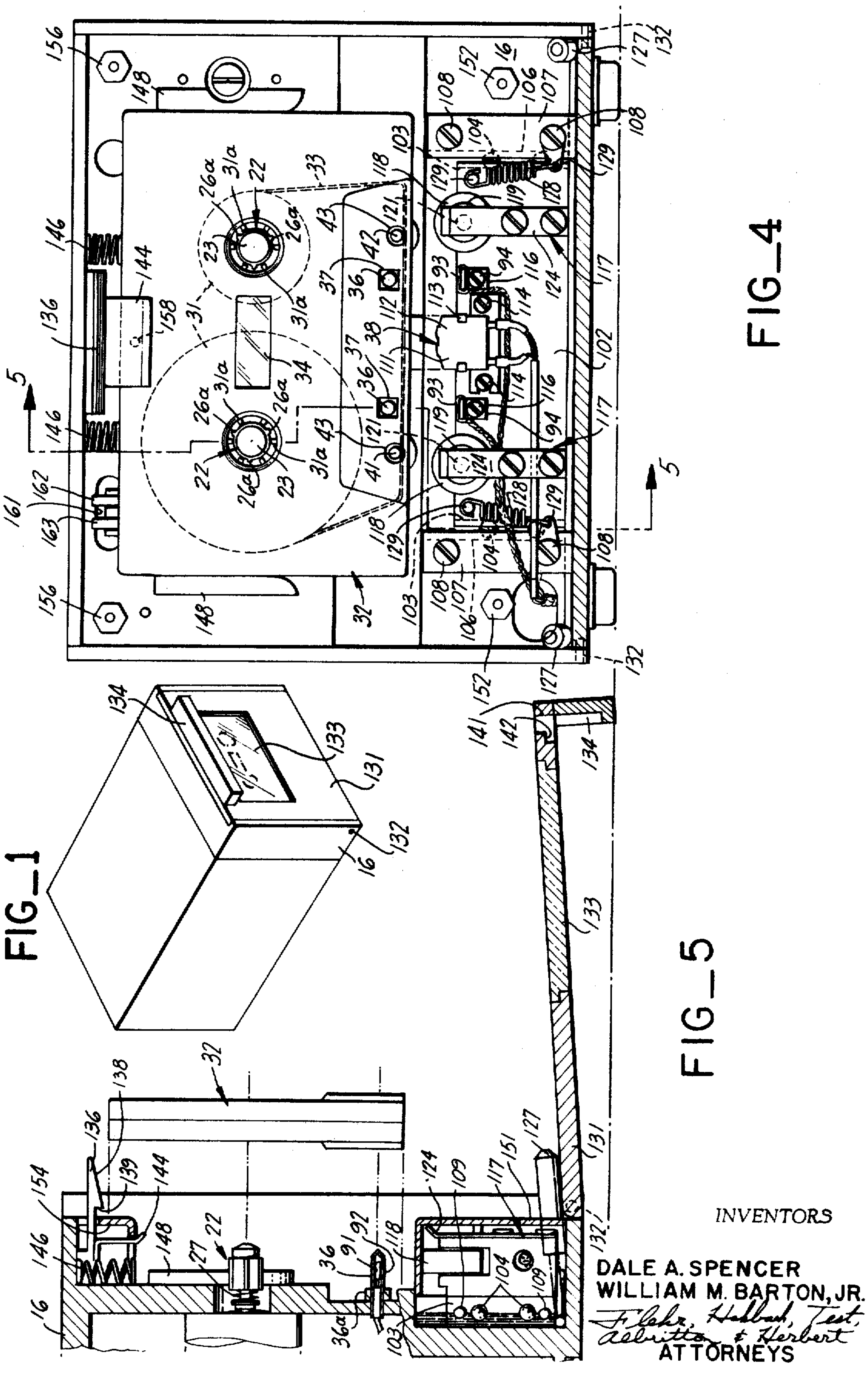
FIG. 1 is an isometric view of a cassette recorder-reproducer incorporating the present invention.
FIG. 4 is a front elevational view of the recorder-reproducer shown in FIG. 2 but showing the door in an open position.
FIG. 5 is a cross-sectional view taken along the line 5—5 of FIG. 4.

In many situations, the cassettes 31 are provided with magnetic tape which has a clear leader on each end of the tape. Means is provided for sensing when such clear leader is passing over the magnetic head 38 and consists of a miniature light bulb 91 provided in each of the guide or registration pins 36. Light from the miniature light bulb exits through a small hole 92 (see FIG. 5) and is directed downwardly towards the magnetic tape 33 carried within the cassette 32. Light which passes through the clear portion of the tape is adapted to be sensed by suitable means such as a solar cell 93 carried by a bracket 94. It can be seen that since the guide pin 36 is positioned so the clear leader reaches it before the magnetic head, it is possible to sense the clear leader on the magnetic tape before the clear leader reaches the magnetic head.

In order to insert and remove the cassette 32, it is necessary to move the tape head assembly 38 to a position out of engagement with the tape carried by the cassette. For this reason, the magnetic head assembly 38 is carried by a movable head plate assembly 101. The movable carriage consists of a flat rectangular head plate 102 which is provided with V-shaped ways 103 on opposite ends of the same which receive ball bearings 104 that also travel in ways 106 provided in members or plates 107 secured to the top plate 16 by screws 108. Pins 109 are provided on the upper and lower portions of opposite ends of the head plate 102 and serve to retain the ball bearings 104 within the ways 103 and 106. Alternatively, if desired in place of the ball bearings 104, a dowel pin can be provided to make possible a sliding contact between the head plate 104 and the members 107 rather than a rolling contact provided by the ball bearings.

The tape head assembly 38 is of a conventional type and consists of a write head 111 and a read head 112. The heads 111 and 112 are mounted in a bracket 113 which is secured to the head plate 102 by screws 114. The brackets 94 carrying the solar cells 93 are secured to the head plate 102 by screws 116.

The head plate assembly 101 includes means for urging the tape into engagement with the capstans 41 and 43 and consists of pressure roller assemblies 117 mounted upon the plate 102. Each of the pressure roller assemblies 117 consists of a pinch roller 118 formed of a suitable material such as a silicon rubber compound mounted upon a hub 119 formed of suitable material such as aluminum. The hub 119 is provided with an Oilite bushing (not shown) that is mounted upon a shaft 121 mounted upon the upper legs of a U-shaped member 122 in such a manner that the roller is disposed between the legs of the U-shaped member. The U-shaped member 122 is secured to the plate 102 by screws 123. The rollers 118 are ground for concentricity in diameter and also as to width tolerance. The silicon rubber compound is utilized because it provides a good resistance to compression set. A spring member 124 is secured to each of the U-shaped members 122 by the screws 123 and is adapted to engage the cassette 32 as hereinafter described to hold the cassette solidly against the base portions **36*a* of the guide pins 36**.

Means is provided for moving the head plate assembly 101 in an upward direction to bring the tape head assembly 38 into engagement with the tape and also urge the rollers 118 into engagement with the tape and thereby urge the tape against the capstans 41 and 43 and consists of a rod-like or lever-like member 126 which is provided with a U-shaped portion **126*a* with integral ends 126*b* and 126*c*. The member 126 is also provided with integral portions 126*d* and 126*e* which are between the end portions 126*a* and 126*c* and the U-shaped portion 126*a* and which are seated behind the members 107 in such a manner that the rod-like member 126 can be pivoted to raise and lower the U-shaped portion 126*a*. As shown particularly in FIG. 2, the U-shaped portion 126*a* is adapted to engage the head plate 102. Caps 127 are mounted on the end portions 126*a* and 126*c* of the rod-like member 126. As can be seen, the end portions 126*a* and 126*c* lie in a plane which is inclined only slightly above the horizontal when the U-shaped portion 126*a* is in a horizontal position. The caps 127 can be manually engaged to cause the rod 126 to act as a lever to raise the head plate 102 against the yieldable force of the tension springs 128 mounted between pins 129 carried by the plate 102 and plates 107 (see FIG. 4). The caps 127 are adapted to be engaged by a door 131 which is hinged to the lower extremity of the top plate 16 by pivot pins 132 threaded into the door 131 and engaging opposite sides of the top plate 16. The door 131 has a glass window mounted therein to permit viewing of the cassette. The door is also provided with an outwardly extending handle 134 at its upper extremity. It can be seen that as the door 131 is raised, it will cause lifting of the caps 127 and the rod-like member 126 which serves as a lever to raise the carriage 101 to bring the tape head assembly 38** into engagement with the tape as hereinbefore described.

Means is provided for retaining the door 131 in a closed position and consists of a spring-like member 136 formed of a suitable material such as plastic which is secured to the plate 16 by screws 137. The member 136 is provided with an inclined surface 138 and surface 139 which extends at right angles thereto. The spring-like member 136 is adapted to extend through an elongate slot 141 provided in the door 131 in such a manner that the spring-like member 136 is cammed upwardly by the inclined surface 138 and then latches the door 131 in a closed position by having the surface 139 engage a corresponding vertical surface 142 provided on the door. To open the door, it is merely necessary to push upwardly on the spring-like member 136 with one hand to release the spring-like member from the door and at the same time to pull the upper end of the door outwardly by use of the handle 134.

A spring member 144 is secured to the top plate 16 by screws 137 and has a downwardly depending portion **144*a* adapted to engage the upper side of a cassette 32. Spring means is provided for yieldably urging a cassette mounted in the recorder downwardly towards the head assembly 38 and consists of a pair of compression springs 146 which are secured to the top plate 16 by suitable means such as cement. The top plate 16 is provided with raised abutments 148** which are positioned in such a manner so that they are on opposite sides of a cassette inserted within the recorder and are provided for roughly positioning a cassette laterally within the recorder.

A cover plate 151 is mounted over the carriage head 101 and is secured to posts 152 by screws 153. The posts 152 are threaded into the top plate 16. Similarly, a cover plate 154 is provided which is secured to posts 156 by screws 157. The posts 156 are also threaded into the top plate 16. A locating pin 158 is mounted in the top plate 16 behind the spring portion **144*a***.

The cassette 31, when mounted in the recorder, is located in an X–Y plane and vertically as well by the guide pins 36. The back side of the cassette is supported at three points, two of the points being provided by the bases **36*a* of the guide pins 36 and the other by the single pin 158. The cassette is spring-loaded downwardly against these three support points by leaf spring 144 which engages the top side of the cassette and by the two leaf springs 124 carried by the head plate assembly 101 which engages the lower portion of the cassette 31. The two springs 146 force the cassette against the guide pins 36** to provide positive registration in a downward direction.

The top plate 16 is provided with an opening 161 through which the operating arms 162 and 163 of two microswitches 164 and 166 can extend. The two microswitches 164 and 166 are secured to a bracket 167 which is secured to the rear side of the top plate 16 by screws 168. The switch 162 is utilized to ascertain whether or not a cassette is in the recorder. The other switch 163 is to sense whether or not the tab (not shown) provided in the cassette has been broken out. If this tab has been broken out, it is impossible to record any additional information on the cassette because the switch will not be depressed. In this way it is possible to protect the record on a cassette and prevent it from being erased.

Another microswitch 171 is secured to the back side of the top plate 16 by screws 172. It is provided with an operating arm 173 which is engaged by a pin 174 that extends through a hole 176 provided in the top plate and which is secured to the back side of the head plate 102. As the head plate assembly 101 is raised, the microswitch 171 is operated just before the rollers 118 come into engagement with the tape and push the tape against the capstans. The switch provides a signal which is utilized to pull out any slack in the tape between the reels of the tape cassette which may have developed from handling of the cassette. With the present invention, it is necessary that the tape be taut between the two capstans before it is clamped to the capstans 41 and 42.

A latch assembly 178 is provided on the rear side of the top plate 16 and includes a bracket 179 which is secured to the plate 16 by screws 181. A latch 182 is pivotally mounted within the bracket 181 by a pin 183. The latch is adapted to extend through a slot 184 provided in the top plate and through a slot 186 provided in the case 13. The latch assembly is useful for mounting the recorders in racks. For example, as many as three of the recorders can be mounted in a conventional 19 inch rack.

Figures 8, 9:
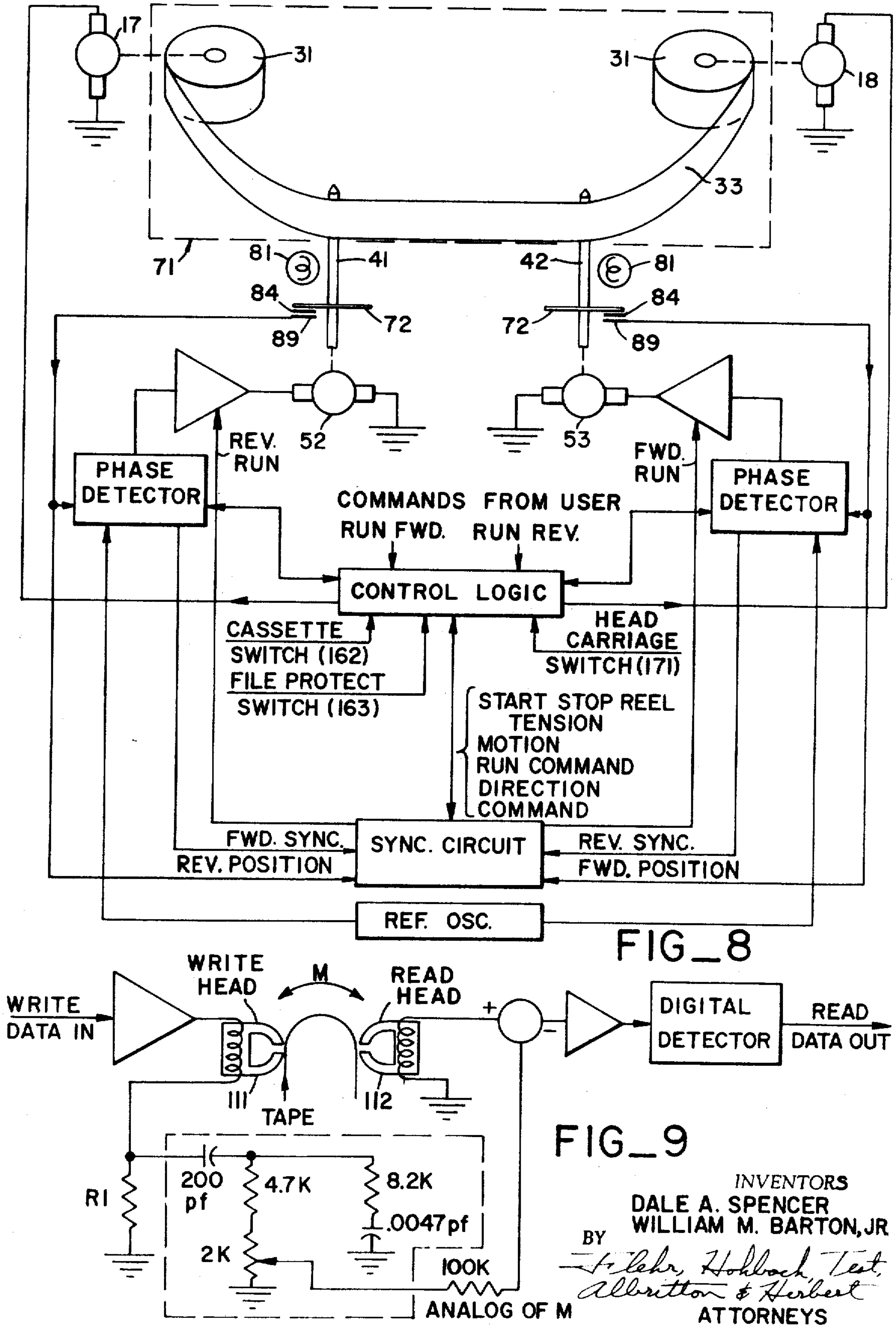
FIG. 8 is a block diagram with certain parts schematically illustrated showing the electronic circuitry for the cassette recorder-reproducer shown in FIG. 1.
FIG. 9 is a block diagram with certain parts schematically illustrated of the read after write tape head and associated circuitry.

As hereinbefore explained, electronic circuitry is provided as a part of the recorder and is mounted onto a plurality of printed circuit boards (not shown) which are mounted on a mother board within the U-shaped framework 12. Block diagrams of selected portions of this electronic circuit are shown in FIGS. 8 and 9 together with schematic illustrations of portions of the recorder hereinbefore described. The function and operation of this electronic circuitry will be described in conjunction with the operation of the recorder as hereinafter set forth.

Operation of the digital cassette recorder may now be briefly described as follows. Let it be assumed that the recorder is in the static condition. A cassette 32 of the type hereinbefore described is placed in the recorder. As the door 131 is closed, the pinch rollers 118 are moved upwardly and sandwich the tape 33 between the rollers and the capstans so that the tape is held in two spaced apart positions. If the recorder is in the stop mode, there is no voltage supplied to either the capstan drive motors 52 and 53 and the tape remains stationary. Any initial slack in the tape between the two capstans is removed. This is accomplished by supplying energy to the reel motors 17 and 18, before the pinch rollers force the tape against the capstans, to remove any slack between the two capstans 41 and 42.

Now let it be assumed that the tape 33 is running at a constant speed. When this is true, both capstans 41 and 42 are running at constant speeds. As shown in FIG. 8, the capstans run at a constant speed because they are part of a phase locked loop as shown in FIG. 8. The optical encoder assembly 71 senses the speed of rotation of the capstan to which it is connected and supplies this information in the form of 400 electrical pulses for each revolution of the disc 72 to the associated phase detector. For example, if the tape 33 is moving at a velocity of approximately 6 inches per second, the optical encoder assembly 71 will supply approximately 6,400 pulses per second. The phase detector compares the pulse rate from the optical encoder with a reference frequency supplied by the reference oscillator as shown in FIG. 8. This reference oscillator can operate at a suitable frequency as, for example, 6.4 KHz. The output of the phase detector is supplied through an amplifier to the associated capstan motor to cause the motor to operate at the proper speed. Thus, the phase detector can cause the motor speed to increase or decrease depending upon the information being received from the encoder. The practical effect is that the capstan is rotated at a frequency which is locked in with the frequency of the reference oscillator.

Both the capstans 41 and 42 are operated in this manner. However, the reference frequencies for the two capstans are not the same. They differ by a predetermined amount as, for example, 0.8 percent. This difference in output frequency from the reference oscillator is obtained by providing two separate countdown chains in the reference oscillator which provide two output frequencies which differ in frequency by the desired amount as, for example, by the 0.8 percent. These two frequencies are then applied to the servo loops for each capstan so that each capstan is forced to operate at the reference frequency.

The differing capstan velocities are provided to maintain a constant tension on the portion of the tape 33 between the two capstans. This portion of the tape between the two capstans is conventionally called the "loop." Because the two capstans are operating at these two differing velocities, the tape loop is actually stretched by the amount of the differing velocities as, for example, by 0.8 percent. This stretching of the tape is well below the elastic limit of the tape. As soon as the tape passes the capstans, it returns to its normal length.

This tape tension provided by the differing velocities of the capstans is very important to ensure proper tension of the tape in the area of the magnetic head assembly and to hold the tape against the magnetic head assembly 38.

It is desirable to produce the tape tension in the vicinity of the magnetic head in this manner. It has been found that if it is attempted to apply these tensions to the tape by the use of the reels that this will cause binding and also stop the take-up or supply reel from turning. The present arrangement permits a high operating tension on the tape between the two capstans in the area of the head while at the same time utilizing a lower operating tension for the tape going onto the take-up reel of the cassette.

With the arrangement shown, it can be seen that when the tape is being reeled onto the take-up reel 31 that the capstan 42 will be operated at a velocity which is 0.8 percent greater than the velocity of the capstan 41 to maintain the desired tension on the tape loop between the capstans. It also can be seen that the converse will be true when the tape 33 is being moved in the opposite direction, the capstan 41 will be operating at a higher velocity than the capstan 42.

From the foregoing description, it can be seen how the tape loop remains taut during operation of the recorder. An additional problem is posed in starting the two capstans from a stop condition and bringing them up to a running condition and not permitting the tape loop to go slack or to be excessively stretched during the starting time or during the stopping time. These additional functions are performed by the sync circuit shown in FIG. 8. Upon receipt of the start command, the capstan which is feeding tape from the loop is started and is instructed to acquire synchronization with the reference oscillator. The capstan that is controlling the tape passing into the loop is started only after the optical encoder on the outgoing capstan shows that it has turned by two encoder lines which produces a stretching of the tap 0.002 inches. At this time, the ingoing capstan is instructed to start and to reach synchronism. If the ingoing capstan should have a tendency to overrun the outgoing capstan or the outgoing capstan should underrun the ingoing capstan, the difference of two lines between the two capstans may change. The sync circuit keeps track of this difference in the number of lines between the outgoing encoder and the incoming encoder during the time that the capstans are being brought up to speed so that a constant tension is maintained on the tape between the tape heads.

A similar operation takes place during movement of the capstans from a running condition to a stop condition. In stopping the capstans, the ingoing capstan is instructed to go to a stop condition. The outgoing capstan, providing that the ingoing capstan does not overrun, is instructed to go to the stop condition as well. In the event that the ingoing capstan overruns, the sync circuit will again instruct the outgoing capstan to restart to maintain the desired taut condition on the tape until both capstans have been brought to stop conditions.

The sync circuit which is utilized is of a type which can be readily constructed by one skilled in the art. For example, it can consist of a conventional up-down counter and additional logic circuits which are readily available through the use of integrated circuits.

The circuitry shown in FIG. 8 also includes logic circuitry which is utilized for controlling the torque applied to the reel motors 17 and 18. During the start cycle to overcome the inertia of the tape reel, a higher torque is applied to the motor. For example, if the recorder is being started in a forward direction, the motor 18 for the take-up reel 32 is instructed to produce a high torque to accelerate the inertia of the reel until both the forward and reverse capstans have achieved phase lock. At this time, the control logic instructs the take-up motor 18 to reduce its torque to the normal running torque. The converse is true when the tape 33 is coming in the opposite direction. In this case, the additional torque is supplied by the motor 17.

The up-down counter is provided with a preset which presets it to a zero number of lines difference when it starts counting the pulses received from the encoder. The phase detectors supply information to the sync circuit to indicate when the tape is up to speed in the static running condition.

As can be seen from FIG. 8, other functions are supplied to the control logic as, for example, whether or not a cassette is present by the cassette switch 162, whether the file in the cassette should be protected by the switch 163, and whether the head carriage has been raised by the switch 171.

Means is provided as shown in FIG. 9 to permit reading information from the tape at the same time that information is being written on the tape while having the read and write heads 112 and 111 in relatively close proximity to each other. By way of example, the read and write heads may be spaced relatively close so that there is only 0.150 of an inch between the write gap and the read gap of the two heads. As is well known to those skilled in the art, when the heads are this close together, there is inductive coupling in the form of mutual inductance between the two heads which produces an output voltage at the read head. In other words, the write current induces a voltage in the read head due to the transformer action in the heads. Typically, in the past, this mutual inductance between the heads has been substantially overcome by placing magnetic shielding directly behind the tape. The standard cassettes which are utilized with the present recorder do not have such magnetic shielding means and, therefore, there is a necessity to provide means of a type shown in FIG. 9 to overcome this mutual inductance between the heads. This accomplished by a subtraction technique by developing an electrical analog mutual inductance which is subtracted from the total read voltage on the read head. This is accomplished as shown in FIG. 9 by monitoring the write current passing through the write head by the use of a resistor R-1. An analog of the mutual inductance is then taken by passing this write current information through a pair of RC networks as shown and then developing a voltage which is subtracted from the voltage developed on the read head as shown to eliminate the effect of the mutual inductance or cross-feed between the two heads 111 and 112. Thus, it is possible to read the low level information from the tape at the same time that information is being written on the tape by two heads which are in relatively close proximity to each other.

It is apparent from the foregoing that a new and improved digital cassette recorder has been provided. The recorder utilizes a high performance tape drive mechanism. This mechanism employs two capstans to isolate the tape motion in the head area from perturbations produced by the tape cassette. The dual capstans are driven within phase locked servo loops. Optical encoders feed back precise position information which is synchronized by a reference oscillator. Constant tape tension between the capstans is maintained by digital techniques during start, stop and run modes, thereby eliminating the need for a pressure pad and its wearing effects on the tape. Variations in instantaneous tape speed are minimized, allowing high density phase encoded serial data to be written and read from the cassette tape with good accuracy.

The recorder has read after write capability which allows the user to guarantee that the data has been written properly without having to back space and switch into the read mode of operation. The transport for the tape is designed to operate bi-directionally in the read or write mode.

The cassettes may be readily loaded and unloaded from the recorder. Each cassette, when loaded, is positively clamped in position by guides and springs. There are no solenoids or manual control because all controls are through logic levels provided by the logic circuitry. The machine is placed in operation by snapping in a cassette and closing the dust door.

As can be seen, the recorder is modular in construction so that it may be plugged into the user's equipment and readily serviced. The entire electronics package can be readily separated from the tape transport.

One recorder constructed in accordance with the present invention had the following specifications:

| | |
|---|---|
| Operating Modes: | Read-after-Write Forward, Read Forward, Read Reverse, Fast Forward, Fast Reverse |
| Tape Head Type: | Read-after-Write |
| Number of Tracks: | One or two |
| Gap-to-Gap Spacing: | 0.15" |
| Track Width: | 0.048" Write; 0.032" Read |
| Offset from Tape Center Line: | 0.034" |
| Recording Method: | Saturation NRZ |
| Recording Density: | 1,000 Flux Reversals with internal clock; Up to 3,200 Flux Reversals with external clock |
| Internal Clock: | Available for writing 500 bpi data and gap generation |
| Transfer Rate: | $3.0 \times 10^3$ bits/sec. at 500 bpi and 6 ips |
| Tape Speed: | 6"/sec. |
| Instantaneous Tape Speed Variation: | ± 2.0% long term (± 10% short term) |
| Start Time: | 30 ms |
| Stop Time: | 30 ms |
| Fast Speed: | 24 ips |

We claim:

1. In a digital cassette recorder for use with a cassette of the type having first and second reels rotatably mounted therein with a length of tape wound on the reels, a framework, said framework including a top plate, first and second reel drive shafts rotatably mounted with respect to said framework and extending through said top plate, said shafts being adapted to engage the first and second reels in the cassette to drive the first and second reels, first and second capstans rotatably mounted in the framework and extending through the top plate and being adapted to be disposed adjacent the tape in the cassette, motive means for driving the first and second shafts, first and second motive means connected to said first and second capstans respectively, electrical phase-lock loop means for sensing the speed of rotation of said first and second capstans and connected to said first and second motive means for maintaining a substantially uniform tension on the tape between the capstans during starting, stopping and running conditions of the tape, a carriage, a magnetic head mounted on said carriage, and pinch rollers mounted on said carriage and means for moving said carriage so that said head is moved into engagement with said tape and said pinch rollers are moved into engagement with said tape to urge the tape into engagement with the capstans.

2. A recorder as claim 1 wherein both of said capstans are operated at substantially constant speeds and wherein the constant speed of one capstan differs by a predetermined amount from the constant speed of the other capstan.

3. A recorder as in claim 1 wherein said means for sensing the speed of rotation of the capstans includes optical encoder means and wherein said phase locked loop means includes phase comparator means for receiving information from the optical encoder means, a reference oscillator for supplying a reference frequency to the phase comparator means and means for supplying information from the phase comparator means to the motive means for the capstans.

4. A recorder as in claim 3 wherein said reference oscillator includes means for supplying two reference frequencies in which one reference frequency differs from the other by a predetermined amount.

5. A recorder as in claim 1 together with means for increasing the torque on the take-up reel of the cassette until the capstans have been brought up to their constant speeds.

6. A recorder as in claim 1 together with means for changing the motion of one of the capstans from a static condition before changing the motion of the other capstan and means for changing the motion of the other capstan and means for thereafter maintaining the difference in time between the change of motions between the capstans until both capstans reach the same static condition.

7. A recorder as in claim 6 wherein said first static condition is a stop condition and the second condition is a running condition.

8. A recorder as in claim 6 wherein said first static condition is a running condition and said second static condition is a stop condition.

9. A recorder as in claim 1 wherein said means for moving said carriage includes a door mounted on said framework, said door being movable between open and closed positions and means engaged by the door as it is moved between open and closed positions for moving said carriage whereby said head is moved between tape engaging and tape disengaging positions.

10. A recorder as in claim 9 wherein said last named means includes a lever arm pivotally mounted on said top plate, said lever arm having a portion engaging said carriage and having another portion adapted to be engaged by said door.

11. A recorder as in claim 1 wherein said cassette is of the type having a pair of holes therein adapted to receive the first and second capstans and wherein said cassette has a pair of additional holes therein together with guide pins carried by the top plate and adapted to extend through the additional holes in the cassette, said guide pins being adapted to position said cassette with respect to said head carried by the carriage.

12. A recorder as in claim 11 wherein said cassette is of the type having a tape having a clear leader on at least one end of the tape together with means for sensing when the clear leader is approaching the head.

13. A recorder as in claim 12 wherein said means for sensing when the clear leader is approaching the head includes a light source disposed on one side of the tape and means for sensing light disposed on the other side of the tape.

14. A recorder as in claim 13 wherein said light source is disposed within one of said guide pins.

15. A recorder as in claim 1 together with additional spring means for positioning said cassette with respect to the tape, said spring means including a spring member adapted to engage one side of the cassette, and at least one additional spring member carried by the carriage and adapted to engage the cassette as the head is moved into engagement with the tape carried by the cassette.

16. A recorder as in claim 15 together with means adapted to support said cassette in a predetermined plane with respect to said head.

17. A recorder as in claim 16 together with spring means carried by the framework and adapted to engage one side of the cassette to urge the cassette against the guide pins in a direction toward the head.

18. A recorder as in claim 1 wherein said head has read and write heads spaced in relatively close proximity to each other so that a mutual inductance is established between the heads, and electrical means including at least one RC network for sensing the current flowing in the write head and for developing an analog voltage of the mutual inductance and for subtracting it from the voltage developed in the read head to provide an output from the read head which is substantially unaffected by information being supplied to the write head.

19. In a digital cassette recorder of the type for use with a cassette having supply and take-up reels rotatably mounted therein with a length of tape wound on said supply and take-up reels, a framework, said framework including a top plate, first and second reel drive shafts rotatably mounted with respect to said framework and extending above said top plate, means mounted on said first and second reel drive shafts for mating with said supply and take-up reels in the cassette for driving the supply and take-up reels, motive means for driving said first and second reel drive shafts, at least one capstan rotatably mounted on the framework and extending through the top plate and adapted to be disposed on one side of the tape in the cassette, motive means for driving said capstan, a carriage slidably mounted on said top plate, a head mounted on said carriage, a pinch roller mounted on said carriage, a door mounted on said framework and movable between open and closed positions with respect to said top plate, and means operated by the door for moving said carriage and the head and pinch roller carried thereby into a position in which the head engages the tape and the pinch roller engages the tape and urges the tape into engagement with the capstan.

20. A recorder as in claim 19 together with means carried by the face plate for precisely positioning the cassette with respect to the head, said means including spring means mounted on the top plate and adapted to engage one portion of the cartridge and additional spring means carried by the carriage and adapted to engage other portions of the cassette.

21. A recorder as in claim 20 wherein said cassette is of the type having a pair of holes therein together with guide pins mounted on the top plate and adapted to extend through the additional holes in the cassette to position the cassette with respect to the head.

22. A recorder as in claim 22 together with spring means carried by the face plate and adapted to engage the cassette to urge the cassette into engagement with the guide pins and in a direction toward the head.

23. In a recorder, a supply reel and a take-up reel, a length of magnetic tape wound on the supply and take-up reels, means for driving the supply and take-up reels, a magnetic head adapted to engage the magnetic tape as it is being advanced between the supply and take-up reels, said magnetic head having write and read heads in relatively close proximity to each other so that a mutual inductance is established between the write and read heads, means for supplying a write current to the write head, said read head developing a read current, means including at least one RC network for measuring the write current in the write head and developing a signal which is an analog of the mutual inductance between the write and read heads for subtracting it from the signal developed in the read head to provide an output signal from the read head which is substantially unaffected by the information carried by the write head.

24. A recorder as in claim 23 wherein said means for developing a signal representing an analog of the mutual inductance between the write and read heads includes a pair of RC networks operating on the current passing through the write head.

* * * * *